United States Patent
Liu et al.

(10) Patent No.: US 6,984,969 B1
(45) Date of Patent: Jan. 10, 2006

(54) HIGH EFFICIENCY HIGH SPEED LOW NOISE REGULATOR

(75) Inventors: Gang Liu, Sunnyvale, CA (US); Joseph C. Buxton, Palo Alto, CA (US); Paul R. Collanton, Jr., Fremont, CA (US)

(73) Assignee: Analog Devices, Inc., Norwood, MA (US)

( * ) Notice: Subject to any disclaimer, the term of this patent is extended or adjusted under 35 U.S.C. 154(b) by 127 days.

(21) Appl. No.: 10/805,459

(22) Filed: Mar. 19, 2004

Related U.S. Application Data

(60) Provisional application No. 60/456,610, filed on Mar. 20, 2003.

(51) Int. Cl.
 *G05F 1/40* (2006.01)

(52) U.S. Cl. ............... 323/286; 323/280; 323/284; 323/303

(58) Field of Classification Search ........... 323/269, 323/271, 272, 274, 275, 280, 284, 285, 286, 323/290, 299, 301, 303; 363/79
See application file for complete search history.

(56) References Cited

U.S. PATENT DOCUMENTS

| | | | | |
|---|---|---|---|---|
| 4,346,349 A | | 8/1982 | Yokoyama | 330/10 |
| 5,003,456 A | * | 3/1991 | Forge | 323/285 |
| 5,416,416 A | * | 5/1995 | Bisher | 363/79 |

* cited by examiner

*Primary Examiner*—Jessica Han
(74) *Attorney, Agent, or Firm*—Koppel, Jacobs, Patrick & Heybl

(57) ABSTRACT

A voltage regulator includes a linear mode regulator having a high pass filter circuit connected between its output and an output node, and a switch mode regulator having an low pass filter circuit connected between its output and the same output node. The high pass filter passes high frequency AC current provided by the linear mode regulator to the output node and reduces the low frequency AC and DC currents to substantially zero, and the low pass filter prevents the high frequency AC current produced by the linear mode regulator from being drawn by the switch mode regulator and passes the low AC and DC currents provided by the switch mode regulator to the output node. Thus, the present regulator offers the high response speed and low noise of a linear mode regulator, and the high power efficiency and large continuous output current capability of a switch mode regulator.

18 Claims, 4 Drawing Sheets

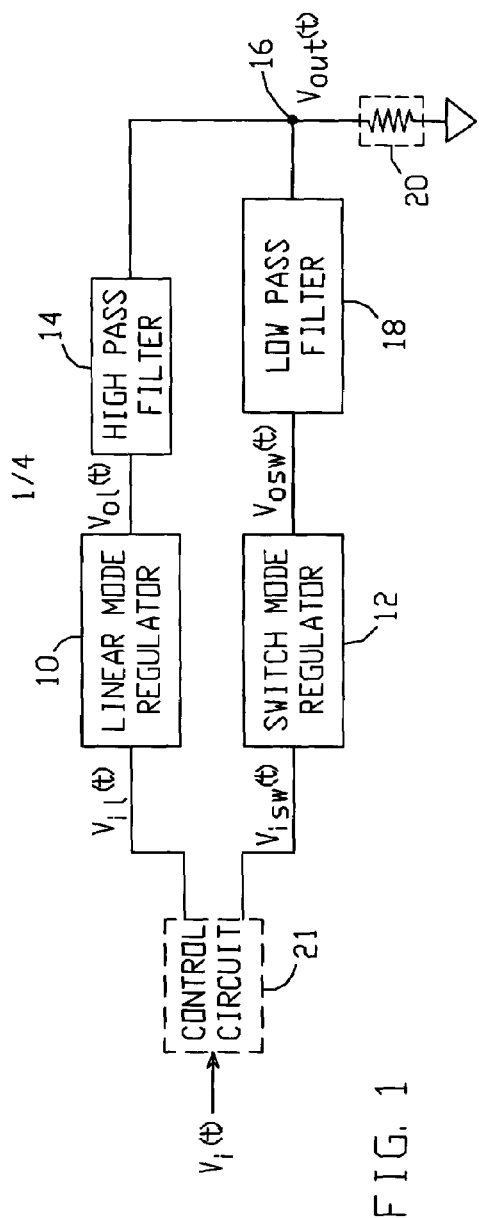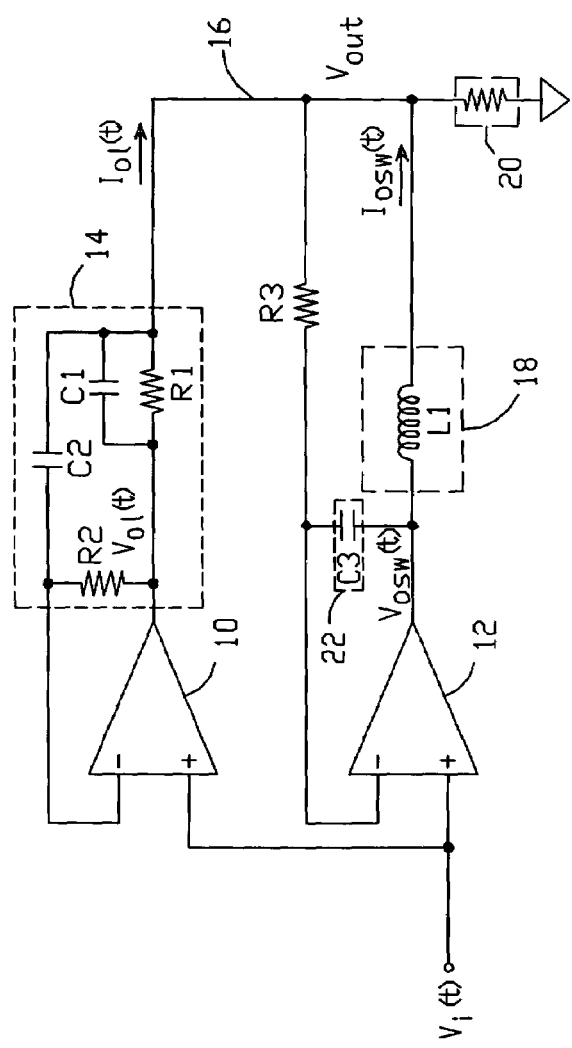
FIG. 1
FIG. 2

HIGH EFFICIENCY HIGH SPEED LOW NOISE REGULATOR

This application claims the benefit of provisional patent application No. 60/456,610, to Liu et al., filed Mar. 20, 2003.

BACKGROUND OF THE INVENTION

1. Field of the Invention

This invention relates to the field of voltage regulators, and particularly to high efficiency, high speed, low noise regulators suitable for powering diode lasers.

2. Description of the Related Art

One type of voltage regulator is an amplifier which receives an input voltage as a desired value and provides a regulated output voltage which follows the input voltage. A linear mode voltage regulator is a voltage regulator which works in linear mode; i.e., the output stage of the regulator has continuous current flowing between two transistor pairs. Linear mode regulators have the advantages of high precision, low noise, and fast response speed—i.e., a wide bandwidth from input to output.

However, such regulators have a low efficiency when the voltage drop across the regulator is high, such as 0.5V to 5V, which happens often, especially when driving laser diodes. Because of this, a linear mode regulator cannot provide a high average output current or power without generating a considerable amount of heat. Although a rail-to-rail linear regulator can provide high output current without generating much heat in its saturation (or near saturation) region, the output current can no longer be regulated (or will soon be unregulated), and the regulator will stop or will soon stop functioning.

A switch mode regulator is one in which a switching circuit switches the output voltage between negative (often the ground) and positive power supply rails, and an output inductor and capacitor network filter out the switching pulses, resulting in a smoothed and continuous output voltage, which is regulated by a control circuit through changing the duty cycle of the pulses in order to follow an input voltage. Such regulators are typically capable of providing a large continuous output current with high power efficiency; as such, they can provide a high average output power without generating much heat. Switch mode regulators can also be configured to produce an output voltage which is higher than the positive power supply rail (the boost type), or lower than the negative rail (the inverting type). These two functions cannot be realized by linear regulators, since their output stages will be saturated when the outputs approach the power rails.

However, switch mode regulators tend to have a low response speed—i.e., a narrow signal bandwidth from input to output, and large noise. The low response speed is caused by the output filtering circuit, which includes at least one inductor in series with the load, and a capacitor in parallel with the load. The large noise is caused by the pulse-width modulation (PWM) control circuit, which provides a series of pulses with their duty cycles adjusted as needed to operate the switching circuit to regulate the output voltage.

SUMMARY OF THE INVENTION

A novel voltage regulator is disclosed, which combines the positive attributes of both linear mode and switch mode regulators. The resulting regulator is capable of providing a high average output power with high efficiency, while also having high response speed and low noise characteristics.

The block diagram of the design is shown in FIG. 1, which comprises a linear mode regulator 10 which produces an output $V_{ol}(t)$ that is filtered with a high pass filter 14, a switch mode regulator 12 which produces an output $V_{osw}(t)$ that is filtered with a low pass filter 18, and a control circuit 21. $V_i(t)$ is the input signal for the whole regulator, $V_{il}(t)$ is the input signal for the linear mode regulator, and $V_{isw}(t)$ is the input of the switch mode regulator. The outputs of the high and low pass filters are connected together at a node 16, and the resulting voltage $V_{out}(t)$ drives a load 20.

In operation, when the load connected to the output node requires high speed current and/or voltage, the high pass filter circuit acts as a path so that the high frequency AC components in the output signal $V_{ol}(t)$ are provided by the linear regulator. At the same time, the high pass filter reduces the low frequency AC and DC components of the signal provided by the linear mode regulator to the output node to substantially zero, such that the linear mode regulator provides predominately high frequency AC current to the output node. Low pass filter 18 acts to isolate the high frequency AC current produced by the linear mode regulator from being drawn by the switch mode regulator output node $V_{osw}(t)$; at the same time, low pass filter 18 provides a path for low frequency AC current and DC current in $V_{osw}(t)$ to reach node 16, such that the switch mode regulator provides predominately low frequency AC and DC current to the output node. Thus, the present regulator offers high response speed and low noise due to the operation of the linear mode regulator, and high power efficiency, large continuous output current capability, and wide output voltage range (it can go negative when the switch mode regulator is configured in inverting scheme and go higher than the positive power supply rail when the switch mode regulator is configured in boost scheme) due to the operation of the switch mode regulator. As such, the present regulator is well-suited to applications which require all of these characteristics, such as when driving one or multiple laser diodes.

Further features and advantages of the invention will be apparent to those skilled in the art from the following detailed descriptions, taken together with the accompanying drawings.

BRIEF DESCRIPTION OF THE DRAWINGS

FIG. 1 is a block diagram of a voltage regulator per the present invention.

FIG. 2 is a schematic diagram of one possible embodiment of a voltage regulator as shown in FIG. 1.

DETAILED DESCRIPTION OF THE INVENTION

Figure 3:
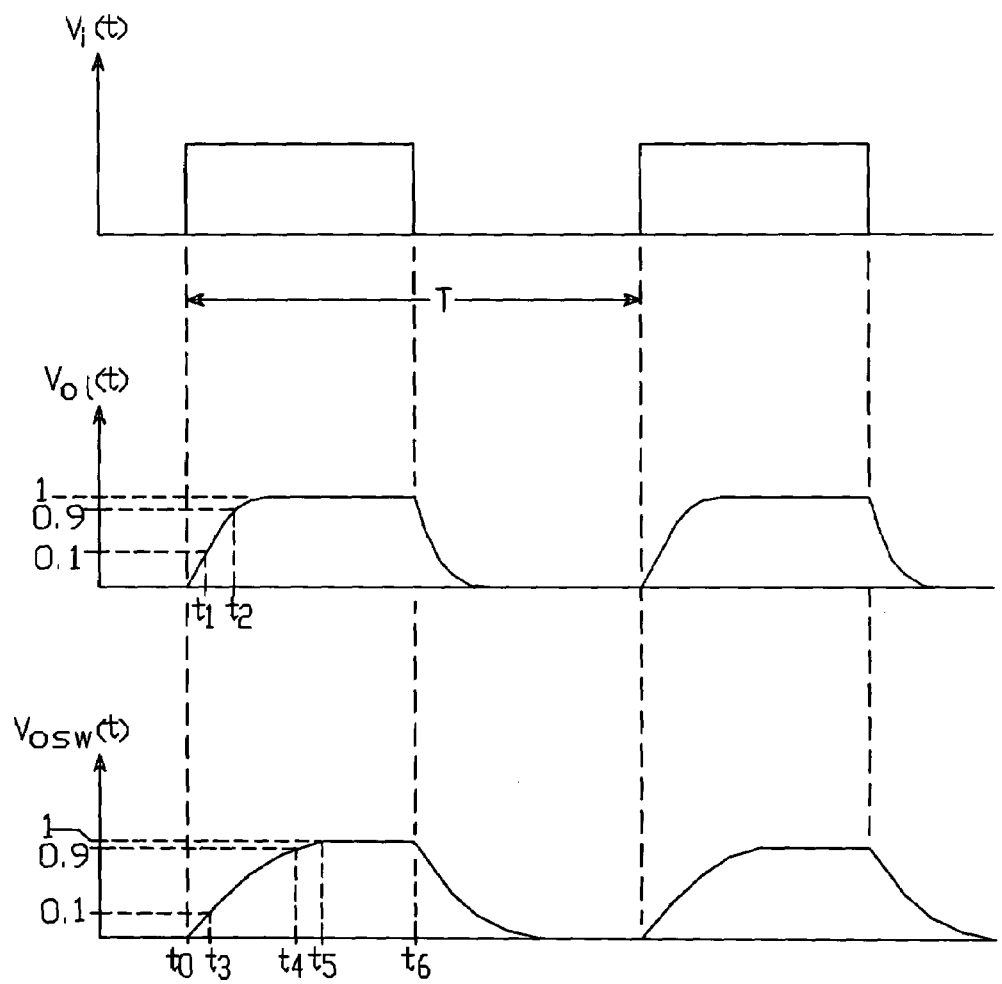
FIG. 3 is a waveform diagram illustrating the operation of the voltage regulator shown in FIG. 1 and FIG. 2.

The basic principles of a voltage regulator in accordance with the present invention are illustrated in FIG. 1. The present regulator comprises a linear mode voltage regulator 10 and a switch mode voltage regulator 12. Linear mode regulator 10 produces an output voltage $V_{ol}(t)$ and switch mode regulator 12 produces an output voltage $V_{osw}(t)$, in response to an input signal $V_i(t)$ applied at the input side of a control circuit 21. A high pass filter circuit 14 is connected between output voltage $V_{ol}(t)$ and an output node 16, and a low pass filter circuit 18 is connected between output voltage $V_{osw}(t)$ and output node 16. The voltage $V_{out}(t)$ at output node 16 may be connected to drive a load 20. Input signal $V_i(t)$ is provided by, for example, a signal source which operates the regulators as necessary to meet the needs of a particular load 20. Linear mode regulator 10 and switch mode regulator 12 may be activated with input voltages $V_{il}(t)$ and $V_{isw}(t)$, respectively, provided by control circuit 21. $V_{il}(t)$ and $V_{isw}(t)$ may be equal or different voltages, such that a load connected to output node 16 is driven by both regulators.

The high pass filter circuit 14 is arranged to reduce the low frequency AC current and the DC current provided by linear mode regulator 10 to output node 16 under certain conditions—for example, when $V_{ol}(t) \approx V_{out}(t)$. The low pass filter circuit 18 is arranged to isolate high frequency AC current produced by linear mode regulator 10 from being drawn by switch mode regulator 12, so that the high frequency AC current from the linear mode regulator is mostly delivered to load 20. Thus, when load 20 requires high speed current, linear mode regulator 10 provides predominately the high frequency AC current to output node 16, and switch mode regulator 12 provides predominately low frequency AC current and DC current to output node 16.

When so arranged, the present regulator can provide the high response speed and low noise of a linear mode regulator, and the high power efficiency, large continuous output current capability, and wide output voltage range of a switch mode regulator. This combination of characteristics makes the regulator well-suited for certain demanding applications. For example, diode lasers, especially the ones used as the optical pump light source in optical amplifiers, generally need to be powered with a high continuous current, but may occasionally require high magnitude high speed current. The present regulator is capable of providing both the high speed and the high continuous current required by such an application.

FIG. 2 is one possible embodiment of a voltage regulator in accordance with the present invention. Here, linear mode regulator 10 and switch mode regulator 12 are represented as amplifiers. Linear mode regulator 10 is shown connected to provide unity gain, though this is merely an example—the linear and/or switch mode regulators may provide gains as required by particular applications. Switch mode regulator 12 is shown with one of its inputs connected to receive $V_i(t)$ as the input signal and its other input connected to output node 16 via a resistor R3, and to $V_{osw}(t)$ through a capacitive network 22; this enables output voltage $V_{out}(t)$ to be sensed and used to provide the low frequency AC component and DC component and $V_{osw}(t)$ to provide the high frequency AC component, for the feedback signal, such that the regulator provides an output voltage $V_{osw}(t)$ which tries to make $V_{out}(t)$ to be equal to $V_i(t)$, and, at the same time, ensure stability of the switch mode regulator itself.

Here, circuit 14 comprises R1 and C1, which form a high pass filter, R2 which provides a low frequency AC and DC components feedback path from $V_{ol}(t)$, and C2 which provides a high frequency AC component feedback path from $V_{out}(t)$, to the inverting input of amplifier 10, forming the feedback signal.

Figure 4:
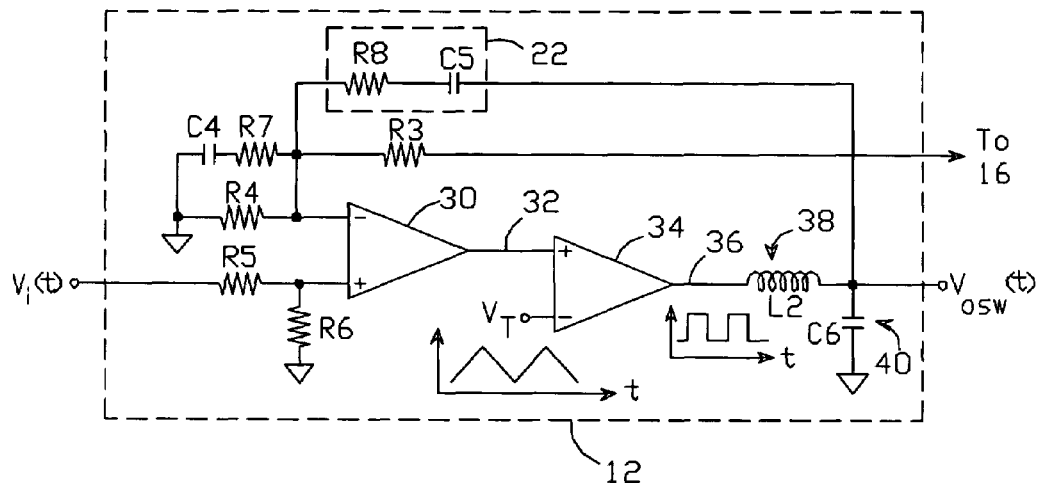
FIG. 4 is a schematic diagram of one possible embodiment of a switch mode regulator which might be used with the present invention.

For the switch mode regulator, circuit 18 comprises an inductor L1, which forms the low pass filter. Capacitive network 22 provides a high frequency AC component feedback path from $V_{osw}(t)$ to the inverting input of the switch mode regulator, and resistor R3 provides a low frequency AC and DC components feedback path from $V_{out}(t)$ to the inverting input of the switch mode regulator. It is worth noting that capacitive network 22 provides a feedback signal path directly between the output $V_{osw}(t)$ and the input of the switch mode regulator, so that the control loop is stable. Without network 22, the control loop would be unstable due to two phase delays: one caused by the nature of the switch mode regulator output, e.g., an LC network, L2 and C6 present in the output (as shown in FIG. 4); the other caused by the low pass filter 18 (L1).

The high pass filter formed by C1 and R1 acts to provide a path for the high frequency AC current to go through from the linear regulator output $V_{ol}(t)$ to the final output $V_{out}(t)$, and to reduce the low frequency AC current and DC current drawn from the linear mode regulator 10 at output node 16 under certain conditions; here, the low frequency AC current and DC current provided by linear mode regulator 10 is reduced to approximately zero. For example, assume that $V_i(t)=1$ volt, the offset voltage at the input of the linear regulator is zero, and steady-state operation conditions, the voltage at output node 16 $V_{out}(t)$ set by switch mode regulator 12 is 1 volt. Similarly, the voltage $V_{ol}(t)$ at the output of linear mode regulator 10 is also 1 volt. Thus, the low frequency AC and DC currents $I_{ol}(t)$ through the high pass filter resistor R1 is:

$$I_{ol}(t)=(1\text{ volt}-1\text{ volt})/R1=0.$$

"Low frequency" means low enough that the impedance of capacitor C1 is much higher than the impedance of R1, i.e., $2\pi fC1 \gg R1$, where f is the frequency (in Hz).

The resistance R1 of the high pass filter resistor is typically designed to be not very small, e.g., 1 $\Omega$, such that $I_{ol}(t)$ is still small even if the regulators exhibit a non-zero offset voltage between the two input nodes of the linear regulator. If this resistor were too small, the DC current drawn from the linear regulator might be too high; on the other hand, it cannot be too large, as the medium frequency AC current provided by the linear regulator may not be sufficient for the load, which draws medium frequency AC current from both the linear regulator and switch mode regulator.

The output impedance of a switch mode regulator tends to be low. Thus, if the output of switch mode regulator 12 were connected directly to output node 16, it would tend to draw the high frequency AC current provided by the linear regulator 10 away at the same node. Low pass filter circuit 18 is employed to reduce or prevent this, which blocks the high frequency AC current and provides a path for the low frequency AC current and the DC current.

One possible implementation of low pass filter circuit 18 is shown in FIG. 2, which uses an inductor L1 as a low pass filter or stabilizer which prevents switch mode regulator 12 from drawing high frequency AC current from linear mode regulator 10 through node 16. It works in this way: when the input voltage $V_i(t)$ changes quickly, the linear regulator output $V_{ol}(t)$ follows the change quickly, the high pass filter (R1 and C1) conducts the quick changing current, i.e., the high frequency AC current, to the output node 16, and the load 20 receives this high frequency AC current. The switch mode regulator can only follow slow changes at the input signal $V_i(t)$; therefore, this quick change will not cause the switch mode regulator to change its output $V_{osw}(t)$ much, and the switch mode regulator will not provide much current to the output load. At the same time, the low pass filter blocks the AC current going to the load from being drawn by the switch regulator.

When the input voltage $V_i(t)$ changes slowly, i.e. it contains low frequency AC and DC components, the switch mode regulator follows the change and the low pass filter 18 allows this signal to go through and reach load 20. The linear side can also follow this slow change at $V_{ol}(t)$, but this slow change signal in $V_{ol}(t)$ will be blocked by high pass filter (C1 and R1) and cannot reach the load. Therefore, when the input signal $V_i(t)$ has a high frequency AC component, the linear regulator drives the load; when the input signal has low frequency AC component and DC component, the switch regulator drives the load. When the input signal has both high frequency AC component and, low frequency AC component plus DC components, the linear regulator drives the load with the former component, the switch regulator drives the load with the latter components. For the medium frequency AC component, there is an overlap between the linear and the switch mode regulator in providing the currents to the load; i.e., part of the medium AC frequency current comes from the linear side, the rest comes from the switch regulator side.

The operation of the present regulator is illustrated in the waveforms shown in FIG. 3, where a step signal is required by load 20. Input voltage $V_i(t)$ toggles between zero and a desired value at time $t_0$, has a period of T, and the duty cycle is $(t_6-t_0)/T$. For simplicity, the waveforms assume that each regulator has a unity voltage gain, though as noted above, the invention does not require this. When $V_i(t)$ goes high, so too does the linear mode regulator's output $V_{ol}(t)$, with the rise time of $V_{ol}(t)$ given by $t_2-t_1$. The switch mode regulator's output $V_{osw}(t)$ also goes high, with a rise time given by $t_4-t_3$.

As noted above, the response speed of a switch mode regulator is typically slower than that of a linear mode regulator: whereas a switch mode regulator has a typical response speed of between 10 ms and 10 μs, a linear mode regulator has a typical response speed of 1 ms to 10 ns or even higher. As a result, the rise time of switch mode regulator 12 ($t_4-t_3$) is longer than that of linear mode regulator 10 ($t_2-t_1$). During this initial period, between about times $t_0$ and $t_5$, $V_{ol}(t)$ is greater than $V_{osw}(t)$, the high pass filter circuit makes the output voltage be equal to the linear regulator output voltage $V_{ol}(t)$, so that the load receives the current from the linear regulator in this period of time. If there were no low pass filter circuit, there would be a huge current drawn by the switch regulator from the linear regulator (the linear regulator can also be considered to be drawing high current from the switch regulator). Since there is a low pass filter 18 (see FIG. 1 and FIG. 2), the current between the output node 16 and the switch regulator output $V_{osw}(t)$ is given by:

$$I_{osw}(t) = \frac{1}{L} \int_{t0}^{t5} [V_{osw}(t) - V_{out}(t)] \, dt,$$

as long as the time period between $t_0$ to $t_5$ is short and the inductance of the inductor is large enough, the current $I_{osw}(t)$ is small. This results in linear mode regulator 10 (FIGS. 1 and 2) providing the majority of the output current to load 20 until $V_{osw}(t)$ reaches its final value at time $t_5$.

When inductor L1 has an inductance high enough to largely isolate switch mode regulator 12 from drawing the high frequency AC current provided by linear mode regulator 10 and the high pass filter 14 (in FIG. 1) or C1 and R1 (in FIG. 2) has a low enough impedance for passing the high frequency AC current from $V_{ol}(t)$, output voltage $V_{out}(t)$ tracks $V_{ol}(t)$ between $t_0$ and $t_5$. At time $t_5$, $V_{osw}(t)$ reaches its final value, such that $V_{osw}(t) \approx V_{ol}(t) \approx V_{out}(t)$. As such, after $t5$, switch mode regulator 12 now contributes the majority of the DC current to load 20. Therefore, under transient conditions as shown in FIG. 3, linear mode regulator 10 provides the majority of the output current to load 20 prior to time $t_5$, and switch mode regulator provides the majority of the DC current to load 20 after time $t_5$. It is imperative that the transition between the linear regulator providing the current and the switch regulator providing the current is smooth, not sudden.

In many applications, such as driving a diode laser, the transient period—i.e., the time from $t_0$ to $t_5$ in FIG. 3—is short: e.g., 10 μs–10 ms. Letting linear mode regulator drive the diode laser for such a short time will not unduly increase the temperature of the linear regulator's components, nor will it severely degrade the average total power efficiency, since the transient events take place in a short period of time and occur infrequently. Take EDFA (Erbium Doped Fiber Amplifier) as an example, the transient events, i.e. drop and add transitions, take less than 5% of the total operation time.

Another benefit provided by the present regulator is that, when arranged as described herein, the AC current provided by linear mode regulator 10 cancels the noise caused by the pulse-width modulation (PWM) control circuit which is inside the switch mode regulator 12.

One possible implementation of a switch mode regulator 12 as might be used with the present invention is shown in FIG. 4. A first op-amp (operational amplifier) 30 receives an input signal derived from $V_i(t)$ at the non-inverting input, representing the signal desired at the other input (the inverting input); it receives a another signal derived from $V_{osw}(t)$ and $V_{out}(t)$ at the inverting input, representing the actual output signals; the op-amp produces an error signal 32 which varies proportionally with the difference between its inputs. A comparator 34 receives error signal 32 at one input and a sawtooth-shaped clock signal at its other input and produces a pulse-width modulated (PWM) output signal 36. We assume that the output of the comparator has enough current driving capability for driving the load. In practice, the high current capability output stage is often realized by a pair of high power electronic switches, such as MOSFETs or transistors, which are driven by drivers with well-designed timing controls. For simplicity, we do not show the realization of this portion of circuit. An inductor 38 (L2) and a capacitor 40 (C6) form a low-pass filter which filters the pulses in output 36 and produces smoothed output voltage $V_{osw}(t)$, the switch mode regulator's output. C4, R7, R8 and C5, together with R4 and R3, form a compensation network around op amp 30.

When arranged as shown in FIG. 4, switch mode regulator 12 has a DC gain given by:

$$\text{GAIN} = \frac{V_{oSW}(t)}{V_i(t)} = \frac{R_6}{R_5 + R_6} * \frac{R_4 + R_3}{R_4}$$

Unity gain is achieved when $\frac{R_3}{R_4} = \frac{R_5}{R_6}$.

Note that the switch mode regulator shown in FIG. 4 is merely exemplary; many other implementations are possible. Quite a few other circuit topologies are acceptable, including configurations which enable the switch mode regulator's output voltage to go above the positive power supply rail or below the negative power supply rail, the so-called boost and inverting topologies respectively.

Note that, as shown in FIG. 4, the right side end of resistor R3 would typically be connected to $V_{out}(t)$ when used with the linear regulator per FIG. 2. However, when the regulator is used as a stand alone driver, R3 can alternatively be connected to $V_{osw}(t)$. The advantage of connecting the right end of R3 to $V_{out}(t)$ is that the DC voltage drop caused by inductor L2 would not cause a voltage drop at output voltage $V_{out}(t)$, since the amplifier 30 senses the output voltage $V_{out}(t)$ directly.

Figure 5:
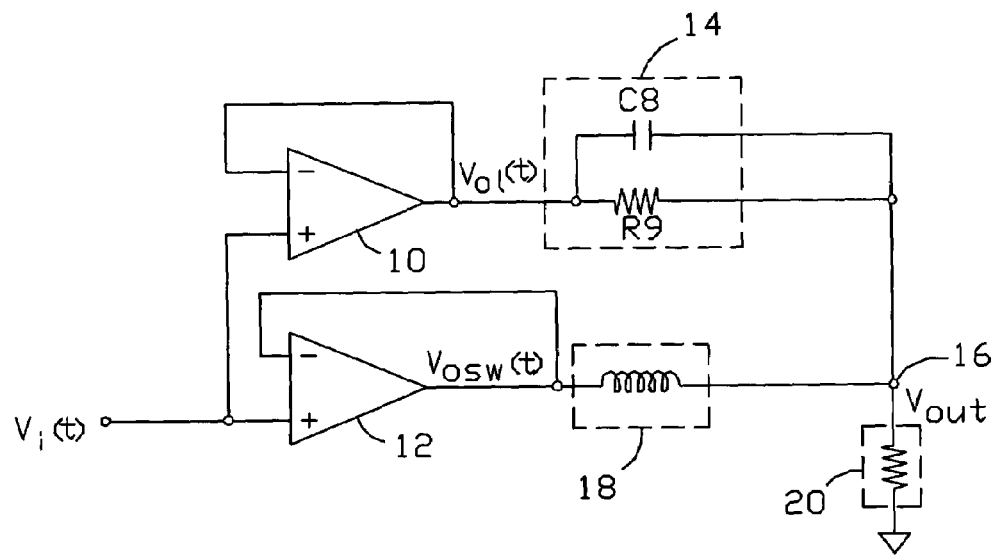
FIG. 5 is a schematic diagram of another possible embodiment of a voltage regulator per the present invention.

Another possible implementation of a regulator per the present invention is shown in FIG. 5, where the linear mode regulator side takes $V_{ol}(t)$ as the feedback signal and the switch mode regulator side takes $V_{osw}(t)$ as the feedback signal. Network 14 serves as a high pass filter which let high frequency AC current pass and reduces the low frequency AC and the DC currents flowing through network 14 so that the low frequency AC and the DC currents flowing between the two regulator outputs are reduced. Adding C8 acts to reduce the high frequency AC voltage drop across R9, thereby increasing the AC coupling efficiency between linear mode regulator 10 output and output node 16.

Figure 6:
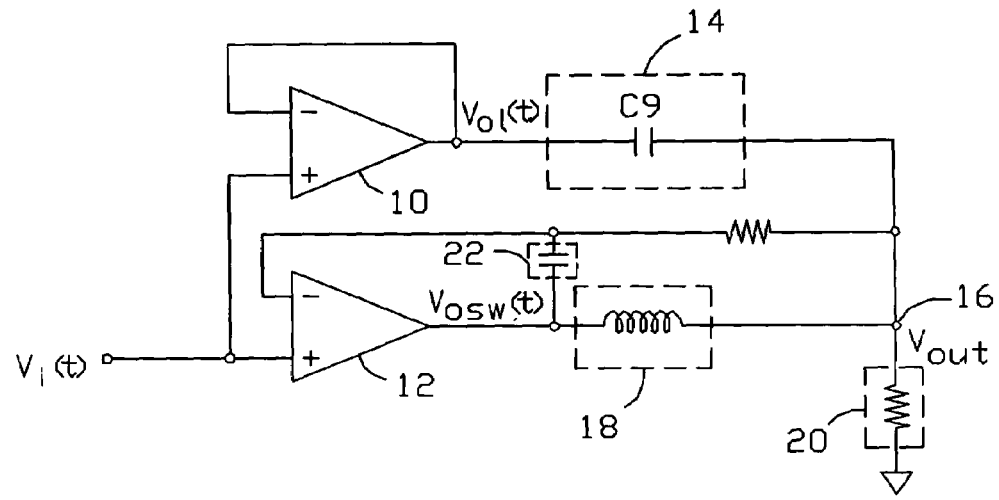
FIG. 6 is a schematic diagram of another possible embodiment of a voltage regulator per the present invention.

FIG. 6 shows another possible implementation of a regulator per the present invention, which is similar to that of FIG. 5, except that there is no DC path between $V_{ol}(t)$ and $V_{out}(t)$. Here, high pass filter circuit 14 is implemented with a capacitor C9, which isolates the linear mode regulator's low frequency AC component and DC component from passing into output node 16, and allows the high frequency AC current in the output $V_{ol}(t)$ to be coupled to load 20. In this way, $V_{out}(t)$ still receives the high frequency AC current from linear mode regulator 10, and the high frequency AC noise current from $V_{osw}(t)$ can still be cancelled by the linear mode regulator.

Figure 7:
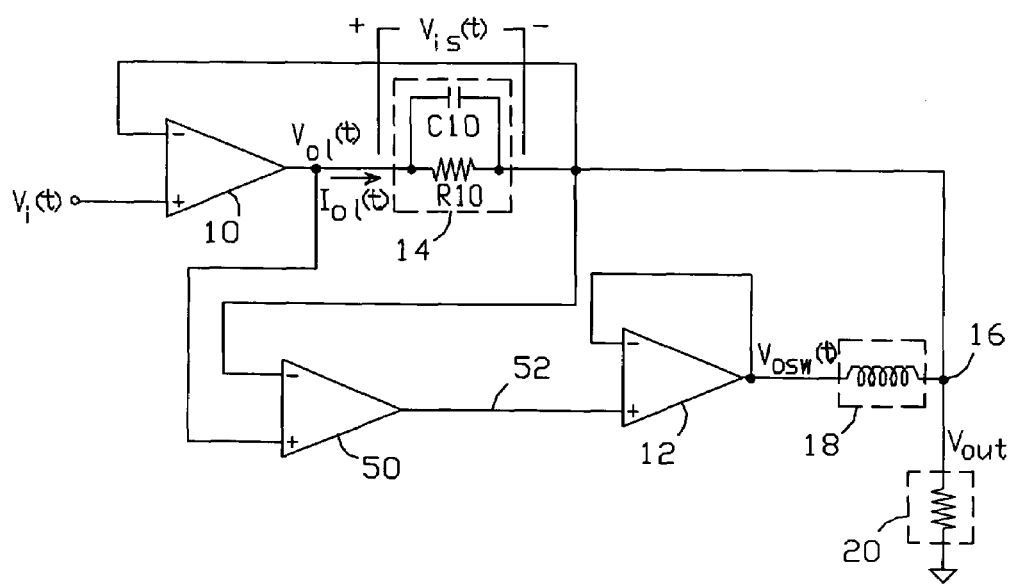
FIG. 7 is a schematic diagram of another possible embodiment of a voltage regulator per the present invention.

One other possible implementation of the present regulator is shown in FIG. 7, where switch mode regulator 12 is controlled by a current sense operational amplifier 50, and the linear mode regulator 10 drives the load 20 through a current sense resistor which usually has low resistance, such as 1 Ω. Here, network 14 is a high pass filter circuit which comprises a resistor R10 and capacitor C10 connected in parallel, where capacitor C10 conducts the high frequency AC current from $V_{ol}(t)$ to output node 16. Network 14 also serves as a current sensing circuit for the output current passing through the output of amplifier 10, $I_{ol}(t)$, and generates a voltage $V_{is}(t)$ across the circuit (R10 in parallel with C10). This voltage contains only medium AC frequency, low AC frequency, and DC components, and is amplified by amplifier 50, of which the output voltage 52 is used to drive the switch mode regulator 12. Output 52 is provided to one input of switch mode regulator 12, with its other input connected to output node 16 as before. When so arranged, op amp 50 tries to control switch mode regulator 12 in such a way that the low frequency AC and DC currents going through the current sense circuit (R10 and C10) equals to zero. This results in switch mode regulator 12 providing the low frequency AC and DC currents to load 20, while the linear mode regulator provides only high frequency AC current to load 20. Op amp 50 would typically include a compensation circuit (not shown) to make the loop stable. The feedback schemes for the switch mode regulator can also be different from that shown in FIG. 7.

The advantage of this implementation (shown in FIG. 7) is that the linear regulator does not need to provide low frequency AC and DC components to output node 16; switch mode regulator 12 automatically provides these components to node 16, even when the offset voltage at the input of the linear amplifier 10 is not small.

The embodiments shown are merely exemplary—there are many other ways in which the invention could be implemented. It is only necessary that the present regulator include a linear mode regulator and a switch mode regulator, combined with a high pass filter circuit and low pass filter circuit such that, when the regulator needs to provide high speed current to a load, the linear mode regulator provides primarily high frequency AC current to the load, and the switch mode regulator provides primarily low frequency AC and DC currents to the load.

While particular embodiments of the invention have been shown and described, numerous variations and alternate embodiments will occur to those skilled in the art. Accordingly, it is intended that the invention be limited only in terms of the appended claims.

We claim:

1. A voltage regulator, comprising:
   an output node which is at an output voltage $V_{out}(t)$;
   a linear mode voltage regulator which produces a first output voltage $V_{ol}(t)$ when activated in response to an input signal $V_i(t)$;
   a high pass filter circuit connected in series between $V_{ol}(t)$ and said output node and arranged to reduce the low frequency AC and DC currents provided by said linear mode regulator to said output node to substantially zero;
   a switch mode voltage regulator which produces a second output voltage $V_{osw}(t)$ when activated in response to an input signal $V_i(t)$; and
   a low pass filter circuit connected in series between $V_{osw}(t)$ and said output node and arranged to isolate high frequency AC current produced by said linear mode regulator from said switch mode regulator;
   such that, when activated, said linear mode regulator provides predominately high frequency AC current to said output node and said switch mode regulator provides predominately low frequency AC and DC currents to said output node, and both of said linear and switch mode regulators provide currents to said output node over a medium frequency range between said high and low frequencies, thereby providing said output voltage $V_{out}(t)$ at said output node.

2. The voltage regulator of claim 1, wherein said high pass filter circuit is a resistor connected in parallel with a capacitor such that said high pass filter circuit reduces the low frequency AC and DC currents provided by said linear mode regulator to said output node to substantially zero.

3. The voltage regulator of claim 1, wherein said low pass filter circuit is an inductor.

4. The voltage regulator of claim 1, wherein said switch mode regulator is activated to produce $V_{osw}(t)$ in response to $V_i(t)$.

5. The voltage regulator of claim 4, wherein said switch mode regulator receives $V_i(t)$ at a first input and a signal representative of $V_{out}(t)$ at a second input and is arranged such that $V_{osw}(t)$ varies such that the difference between said first and second inputs is reduced to approximately zero.

6. The voltage regulator of claim 5, further comprising a compensation network connected between $V_{osw}(t)$ and said switch mode regulator's second input, a compensation network connected between said second input and signal ground, or both of them, to ensure the stability of said switch mode regulator.

7. The voltage regulator of claim 1, wherein $V_i(t)$ is representative of a desired $V_{out}(t)$ value.

8. The voltage regulator of claim 1, further comprising a control circuit arranged to activate said linear mode regulator and said switch mode regulator simultaneously such that a load connected to said output node is driven by both regulators.

9. The voltage regulator of claim 8, wherein said control circuit may generate equal or different voltages for activating said linear mode and switch mode regulators such that a load connected to said output node is driven by both regulators.

10. The voltage regulator of claim 8, wherein said linear mode regulator has a faster response speed than said switch mode regulator such that said linear mode regulator contributes the majority of the high frequency AC current to said load and said switch mode regulator contributes the majority of the low frequency AC and DC output currents to said load.

11. The voltage regulator of claim 1, wherein said load is at least one or more laser diodes.

12. The voltage regulator of claim 1, wherein said high pass filter circuit comprises a resistor and a capacitor connected in parallel such that said capacitor conducts high frequency AC current to said output node and said resistor reduces the low frequency AC and DC currents provided by said linear regulator to said output node to substantially zero.

13. The voltage regulator of claim 1, wherein said high pass filter circuit comprises a capacitor which conducts high and medium frequency AC currents to said output node.

14. The voltage regulator of claim 1, wherein said high pass filter circuit is a current sense resistor connected in parallel with a capacitor, and said switch mode regulator produces $V_{osw}(t)$ in response to an input signal, further comprising an operational amplifier having its inputs connected across said current sense resistor and said capacitor, and its output connected to provide said switch mode regulator's input signal, said operational amplifier and switch mode regulator arranged to drive said output node with the low frequency AC and DC currents so that the current going through said sense resistor is nearly zero such that, during operation, said linear mode regulator provides predominately high frequency AC current to said output node and said switch mode regulator provides predominately low frequency AC and DC currents to said output node.

15. The voltage regulator of claim 1, wherein said switch mode regulator produces $V_{osw}(t)$ at an output terminal in response to $V_i(t)$, said switch mode regulator comprising:
an operational amplifier connected to produce an output which varies with the difference between its two inputs, one of which is derived from $V_{out}(t)$ and the other of which is derived from $V_i(t)$,
a comparator which receives the output of said operational amplifier at a first input and a sawtooth-shaped clock signal at its second input, and is arranged to produce a pulse-width modulated signal at its output,
an output inductor connected between the output of said comparator and said output node, and
a capacitor connected between said output node and ground.

16. The voltage regulator of claim 15, wherein said operational amplifier receives a signal that is derived from $V_i(t)$ at one input and a signal which is derived from $V_{out}(t)$ at its second input, further comprising a compensation network connected between $V_{out}(t)$ and said operational amplifier's second input, a compensation network connected between said second input and signal ground, or having both of the two compensation network circuits employed at the same time, to ensure and/or improve the stability of said operational amplifier.

17. A voltage regulator, comprising:
an output node which is at an output voltage $V_{out}(t)$;
a linear mode voltage regulator which receives an input signal $V_i(t)$ representative of a desired $V_{out}(t)$ value and is arranged to produce a first regulated output voltage $V_{ol}(t)$ which varies with $V_i(t)$;
a high pass filter comprising a resistor connected in parallel with a capacitor, said high pass filter connected in series between $V_{ol}(t)$ and said output node and arranged to reduce the low frequency AC and DC currents provided by said linear mode regulator to said output node to substantially zero;
a switch mode voltage regulator which receives $V_i(t)$ and is arranged to produce a second regulated output voltage $V_{osw}(t)$ which varies with $V_i(t)$; and
an inductor connected in series between $V_{osw}(t)$ and said output node which isolates the high frequency AC current produced by said linear mode regulator from being drawn by said switch mode regulator;
such that said linear mode regulator provides predominately the high frequency AC current to said output node and said switch mode regulator provides predominately the low frequency AC and DC currents to said output node, and both of said linear and switch mode regulators provide currents to said output node in a medium frequency range between said high and low frequencies, thereby providing said output voltage $V_{out}(t)$ at said output node.

18. A voltage regulator, comprising:
an output node which is at an output voltage $V_{out}(t)$;
a linear mode voltage regulator which receives an input signal $V_i(t)$ representative of a desired $V_{out}(t)$ value and is arranged to produce a first regulated output voltage $V_{ol}(t)$ which varies with $V_i(t)$;
a current sense resistor and a capacitor connected in parallel, connected in series between $V_{ol}(t)$ and said output node which allows high frequency AC current to pass through and low frequency and DC current to generate a voltage $V_{is}(t)$ across said current sense resistor and said capacitor;
an operational amplifier having its inputs connected across said parallel-connected current sense resistor and capacitor which produces an output that varies with the difference between its inputs;
a switch mode voltage regulator which receives a signal $V_{osw}(t)$ at one input and the output of said operational amplifier at a second input and which produces an output voltage $V_{osw}(t)$ that varies with the difference between its inputs; and
an inductor connected in series between $V_{osw}(t)$ and said output node $V_{out}(t)$ which isolates high frequency AC current produced by said linear mode regulator from being drawn by said switch mode regulator;
such that said operational amplifier senses the low frequency AC and DC currents going through said current sense resistor and said capacitor, drives said switch mode regulator and thereby said output node to make $V_{ol}(t) \approx V_{out}(t)$ for low frequency and DC components, such that the low frequency AC and DC currents going through said current sense resistor and said capacitor are reduced to approximately zero, so that said linear mode regulator provides predominately high frequency AC current to said output node and said switch mode regulator provides predominately low frequency AC and DC currents to said output node, thereby providing said output voltage $V_{out}(t)$ at said output node.

* * * * *